US010669951B2

United States Patent
Gunnarsson et al.

(10) Patent No.: US 10,669,951 B2
(45) Date of Patent: Jun. 2, 2020

(54) FOUR-STROKE INTERNAL COMBUSTION ENGINE THERETO RELATED VEHICLE AND METHOD

(71) Applicant: Scania CV AB, Södertälje (SE)

(72) Inventors: Niclas Gunnarsson, Huddinge (SE); Michael Vallinder, Stockholm (SE); Anders Larsson, Tullinge (SE); Erik Höckerdal, Södertälje (SE)

(73) Assignee: Scania CV AB, Södertälje (SE)

( * ) Notice: Subject to any disclaimer, the term of this patent is extended or adjusted under 35 U.S.C. 154(b) by 36 days.

(21) Appl. No.: 15/921,984

(22) Filed: Mar. 15, 2018

(65) Prior Publication Data
US 2018/0274456 A1 Sep. 27, 2018

(30) Foreign Application Priority Data

Mar. 22, 2017 (SE) ...................... 1750335

(51) Int. Cl.
*F02D 13/04* (2006.01)
*F02D 13/02* (2006.01)
(Continued)

(52) U.S. Cl.
CPC .............. *F02D 13/04* (2013.01); *F01L 1/053* (2013.01); *F01L 1/344* (2013.01); *F01L 13/06* (2013.01);
(Continued)

(58) Field of Classification Search
CPC .. F02D 13/04; F02D 13/0219; F02D 13/0249; F02D 13/0273; F02D 41/0005;
(Continued)

(56) References Cited

U.S. PATENT DOCUMENTS 6,209,323 B1 * 4/2001 Schmidt ................ B60W 10/06
180/197
6,418,720 B1 * 7/2002 Cornell ................. F01L 13/065
123/321
(Continued)

FOREIGN PATENT DOCUMENTS

WO WO2012038195 A1 3/2012
WO WO2015084243 A2 6/2015

OTHER PUBLICATIONS

European Search Report for European Patent Application No. EP18160617 dated Aug. 2, 2018.

*Primary Examiner* — Mahmoud Gimie
(74) *Attorney, Agent, or Firm* — Moore & Van Allen PLLC; W. Kevin Ransom

(57) ABSTRACT

A four-stroke internal combustion engine is disclosed comprising an exhaust valve control arrangement with an exhaust valve phase-shifting device configured to phase-shift control of the at least one exhaust valve to a state where the at least one exhaust valve is controlled in such a way that it is opened during the expansion stroke of the engine and closed during the exhaust stroke of the engine, in order to achieve engine-braking via compression in the cylinders during the exhaust stroke. An inlet valve control arrangement comprises an inlet valve phase-shifting device configured to regulate the amount of air pumped through the engine during the engine braking by regulating the phase-shift of the at least one inlet valve. The present disclosure also relates to a vehicle comprising an engine and method of controlling an engine, a computer program and a computer program for performing a method of controlling an engine.

22 Claims, 4 Drawing Sheets

(51) Int. Cl.
*F01L 13/06* (2006.01)
*F02D 41/00* (2006.01)
*F01L 1/344* (2006.01)
*F01L 1/053* (2006.01)
*F02B 75/02* (2006.01)
*F01L 9/04* (2006.01)
*F01L 9/02* (2006.01)

(52) U.S. Cl.
CPC ............ *F01L 13/065* (2013.01); *F02B 75/02* (2013.01); *F02D 13/0219* (2013.01); *F02D 13/0249* (2013.01); *F02D 13/0273* (2013.01); *F02D 41/0005* (2013.01); *F02D 41/0007* (2013.01); *F01L 9/02* (2013.01); *F01L 9/04* (2013.01); *F01L 2001/0537* (2013.01); *F01L 2001/34496* (2013.01); *F01L 2250/04* (2013.01); *F01L 2820/01* (2013.01); *F01L 2820/04* (2013.01); *F01L 2820/042* (2013.01); *F01L 2820/044* (2013.01); *F02B 2075/027* (2013.01); *F02D 2041/001* (2013.01); *F02D 2400/02* (2013.01); *Y02T 10/144* (2013.01); *Y02T 10/42* (2013.01)

(58) Field of Classification Search
CPC ....... F02D 41/0007; F01L 1/053; F01L 1/344; F01L 13/06; F01L 13/065
USPC .......................................................... 123/321
See application file for complete search history.

(56) References Cited

U.S. PATENT DOCUMENTS

| | | | |
|---|---|---|---|
| 7,823,559 B2* | 11/2010 | Bohme | F01L 13/06 123/321 |
| 2004/0069256 A1* | 4/2004 | Melchior | F01L 1/26 123/90.12 |
| 2004/0231639 A1* | 11/2004 | Israel | F01L 1/08 123/321 |
| 2007/0039577 A1* | 2/2007 | Hoffmann | F01L 1/08 123/90.16 |
| 2008/0017151 A1* | 1/2008 | Kusaka | F01L 1/34413 123/90.31 |
| 2012/0024260 A1* | 2/2012 | Groth | F01L 1/18 123/321 |
| 2013/0269652 A1* | 10/2013 | Toth | F01L 1/181 123/323 |
| 2017/0002702 A1* | 1/2017 | Gunnarsson | F02D 13/0249 |

* cited by examiner

FOUR-STROKE INTERNAL COMBUSTION ENGINE THERETO RELATED VEHICLE AND METHOD

CROSS-REFERENCE TO RELATED APPLICATION(S)

This application claims priority under 35 U.S.C. 119(a) to Swedish Patent Application No. 1750335-0 filed Mar. 22, 2017, the contents of which are also incorporated herein by reference.

FIELD OF THE INVENTION

The present invention relates to a four-stroke internal combustion engine, a vehicle comprising a four-stroke internal combustion engine, a method of controlling a four-stroke internal combustion engine, and a computer program product for performing a method of controlling a four-stroke internal combustion engine.

BACKGROUND OF THE INVENTION

Internal combustion engines, such as four-stroke internal combustion engines, comprise one or more cylinders and a piston arranged in each cylinder. The pistons are connected to a crankshaft of the engine and are arranged to reciprocate within the cylinders upon rotation of the crankshaft. The engine usually further comprises one or more inlet valves and outlet valves as well as one or more fuel supply arrangements. The one or more inlet valves and outlet valves are controlled by a respective valve control arrangement usually comprising one or more camshafts rotatably connected to a crankshaft of the engine, via a belt, chain, gears, or similar. A four-stroke internal combustion engine completes four separate strokes while turning a crankshaft. A stroke refers to the full travel of the piston along the cylinder, in either direction. The uppermost position of the piston in the cylinder is usually referred to as the top dead center TDC, and the lowermost position of the piston in the cylinder is usually referred to as the bottom dead center BDC.

The strokes are completed in the following order, inlet stroke, compression stroke, expansion stroke and exhaust stroke. During operation of a conventional four-stroke internal combustion engine, the inlet valve control arrangement controls inlet valves of a cylinder to an open state during the inlet stroke of a piston within the cylinder, to allow air, or a mixture of air and fuel, to enter the cylinder. During the compression stroke, all valves should be closed to allow compression of the air, or the mixture of the air and fuel, in the cylinder. If the engine is in a power producing state, fuel in the cylinder is ignited, usually towards the end of the compression stroke, for example by a spark plug or by compression heat in the cylinder. The combustion of fuel within the cylinder significantly increases pressure and temperature in the cylinder. The combustion of the fuel usually continues into a significant portion of the subsequent expansion stroke. The increased pressure and temperature in the cylinder obtained by the combustion is partially converted into mechanical work supplied to the crank shaft in the expansion stroke. Obviously, all valves should remain closed during the expansion stroke to allow the increased pressure and temperature to be converted into mechanical work. The expansion stroke is also usually referred to as the combustion stroke, since usually, the majority of the combustion takes place during the expansion stroke. In the subsequent exhaust stroke, the exhaust valve control arrangement controls exhaust valves of the cylinder to an open state to allow exhaust gases to be expelled out of the cylinder into an exhaust system.

During normal engine braking, occurring for example when a driver of a vehicle releases an accelerator pedal, the engine will continue to operate in the above described strokes, with the exception that, normally, no fuel is supplied to the engine during engine braking, and consequently, no combustion will take place during the end of the compression stroke or during the expansion stroke. In this condition, the engine will provide some braking torque due to internal friction and due to the pumping of air from the inlet to the exhaust, in the respective inlet stroke and exhaust stroke. As a piston travels upward during its compression stroke, the gases that are trapped in the cylinder are compressed. The compressed gases oppose the upward motion of the piston. However, almost all of the energy stored in the compressed gases is returned to the crank shaft on the subsequent expansion stroke. Thereby, during normal engine braking, the compression stroke together with the subsequent expansion stroke, will not contribute to a significant braking torque of the engine.

A compression release engine brake, frequently called a Jake brake or Jacobs brake, is an engine braking mechanism used in some engines. When activated, it opens exhaust valves in the cylinders after the compression stroke, releasing the compressed air trapped in the cylinders to the exhaust system. Thereby, the energy stored in the compressed gases during the compression stroke will not be returned to the crank shaft on the subsequent expansion stroke, which increases the braking torque of the engine.

In some arrangements, the exhaust valves may be deactivated, so that they remain closed during the exhaust stroke. Usually, this is achieved using a so called lost motion arrangement, which when actuated is arranged to not transfer motion caused by an exhaust cam lobe to the exhaust valve. The air in the cylinders will thereby be compressed also during the exhaust stroke. By using a mechanism opening exhaust valves near the end of the exhaust stroke, the compressed air trapped in the cylinders is released to the exhaust system. Such arrangement almost doubles the braking torque since compression and release events are performed in the compression stroke as well as in the exhaust stroke.

The document WO2015084243 A2 relates to a four-stroke combustion engine, which instead of deactivating the exhaust valves in the exhaust stroke, performs a phase-shift of a camshaft arranged to control opening of exhaust valves relative the crank shaft to a state, where the at least one exhaust valve is controlled in such a way, that it is opened during the expansion stroke of the engine and closed during the exhaust stroke of the engine, to achieve engine braking through compression in the cylinders during the exhaust stroke. This solution provides several advantages over traditional engine braking mechanisms used, such as controllability of the size of the braking torque.

Due to environmental concerns, almost all vehicles for sale today comprise some sort of exhaust aftertreatment system. Examples are catalytic converters, particulate filters and Selective catalytic reduction (SCR) arrangements. A selective catalytic reduction arrangement is a means of converting nitrogen oxides, also referred to as NOx with the aid of a catalyst into diatomic nitrogen $N_2$, and water $H_2O$. A gaseous reductant, typically anhydrous ammonia, aqueous ammonia or urea, is added to a stream of exhaust gas and is adsorbed onto a catalyst. Carbon dioxide, $CO_2$ is a reaction product when urea is used as the reductant.

Function of these exhaust aftertreatment systems rely on the high temperature of the exhaust gases. Problems may arise upon long lasting engine braking operations since the gases leaving the engine during engine braking is cooler than exhaust gases produced in a power producing mode, which gases may cool the exhaust aftertreatment system to a temperature in which it may not function properly.

In view of above, there is a need for an improved engine braking of a four-stroke internal combustion engine.

SUMMARY OF THE INVENTION

It is an object of the present invention to provide an efficient engine braking while providing conditions for an improved control of gas temperature of gases leaving the engine during the engine braking.

According to a first aspect of the invention, the object is achieved by a four-stroke internal combustion engine comprising at least one cylinder, a piston arranged in each cylinder, an inlet system, a crankshaft, at least one inlet valve arranged in each cylinder, which inlet valve is connected with the inlet system. The engine further comprises an inlet valve control arrangement configured to control each inlet valve on the basis of a rotational position of the crankshaft, and at least one exhaust valve arranged in each cylinder, which exhaust valve is connected with an exhaust outlet of the engine. The engine further comprises an exhaust valve control arrangement configured to control each exhaust valve on the basis of the rotational position of the crankshaft. The exhaust valve control arrangement comprises an exhaust valve phase-shifting device configured to phase-shift control of the at least one exhaust valve to a state where the at least one exhaust valve is controlled in such a way that it is opened during the expansion stroke of the engine and closed during the exhaust stroke of the engine, in order to achieve engine-braking via compression in the cylinders during the exhaust stroke. The inlet valve control arrangement comprises an inlet valve phase-shifting device configured to regulate the amount of air pumped through the engine during the engine braking by regulating the phase-shift of the at least one inlet valve.

Since control of the at least one exhaust valve is phase-shifted to a state where the at least one exhaust valve is controlled in such a way that it is opened during the expansion stroke of the engine and closed during the exhaust stroke of the engine, engine-braking via compression in the cylinders during the exhaust stroke is obtained in a simple and effective manner. Further, since the inlet valve phase-shifting device is configured to regulate the amount of air pumped through the engine during the engine braking by regulating the phase-shift of the at least one inlet valve, also the temperature of gases leaving the engine during the engine braking is regulated in a simple and efficient manner.

Accordingly, an efficient engine braking is provided while conditions are provided for an improved control of gas temperature of gases leaving the engine during the engine braking. As a result, the above-mentioned object is achieved.

In addition, since conditions are provided for an improved control of gas temperature of gases leaving the engine, conditions are also provided for keeping the temperature of an exhaust aftertreatment system within a suitable temperature interval during the engine braking. Thereby, it can be ensured that for example the temperature of a catalyst arranged in fluid connection with the exhaust outlet is kept over a temperature threshold. In this manner, it can be ensured that the catalyst will function even after a long-lasting engine braking operation, such that after an engine braking operation during a long downhill slope. According to some embodiments, the engine is a diesel engine comprising a selective catalytic reduction (SCR) arrangement using a reductant agent. In these embodiments, it can be ensured that the temperature of selective catalytic reduction arrangement is kept within a proper temperature interval. In this manner, consumption of the reductant agent can be reduced, since a too low temperature of a selective catalytic reduction arrangement leads to an increased consumption of reductant agent, due to the release of reductant agent in the selective catalytic reduction arrangement, which is negative for the environment. Thus, as shown above, conditions are provided for an engine being more environmentally-friendly.

The phase-shift of control of the at least one inlet valve further affects the charge mass, the load on the valves and their drive trains, as well as the braking torque. Accordingly, conditions are provided for a simple and effective control of the amount of air pumped through the engine, as well as a simple and effective control of the braking torque, while it is ensured that maximum loads on the valves and their drive trains not are exceeded.

Optionally, the inlet valve phase-shifting device is configured to phase-shift control of the at least one inlet valve to a state where the at least one inlet valve is controlled in such a way that it is opened during the inlet stroke of the engine and closed during the compression stroke of the engine. Thereby, the at least one inlet valve will be opened at a lower cylinder pressure which reduces the opening force of the at least one inlet valve and thus also reduces load on the inlet valve control arrangement. Further, by phase-shifting control of the at least one inlet valve in this manner, the maximum cylinder pressure during the compression stroke can be reduced. By reducing the opening fore of the at least one inlet valve and by reducing the maximum cylinder pressure, the risk of engine failure during engine braking is reduced.

Optionally, the exhaust valve phase-shifting device is configured to regulate the amount of air pumped through the engine during the engine braking, by regulating the phase-shift of the at least one exhaust valve. Thereby, the amount of air pumped through the engine during the engine braking is regulated to a greater extent and at a faster rate, since phase-shift of the at least one exhaust valve as well as the at least one inlet valve are utilized to regulate the amount of air pumped through the engine. Thereby, it can be further ensured that temperature of gases leaving the engine, and thus also temperature of an exhaust aftertreatment system, is within a suitable temperature interval.

Optionally, the inlet valve phase-shifting device and the exhaust valve phase-shifting device are arranged to regulate the size of the braking torque during engine braking to a set level braking torque by regulating the phase-shift of the at least one inlet valve and the at least one exhaust valve. Thereby, the set level braking torque is obtained in a fast and efficient manner, while ensuring that temperature of gases leaving the engine, and thus also temperature of an exhaust aftertreatment system, is within a suitable temperature interval. The set level braking torque is obtained in a fast and efficient manner since the inlet valve phase-shifting device and the exhaust valve phase-shifting device are utilized to obtain the set level braking torque.

Optionally, the inlet valve phase-shifting device and the exhaust valve phase-shifting device are arranged to phase-shift the at least one inlet valve and the at least one exhaust valve simultaneously. Thereby, the amount of air pumped through the engine during the engine braking is regulated at an even faster rate, since phase-shift of the at least one exhaust valve, as well as the at least one inlet valve, is utilized simultaneously to regulate the amount of air pumped through the engine. Thereby, it can be further ensured that temperature of gases leaving the engine, and thus also temperature of an exhaust aftertreatment system, is within a suitable temperature interval. In addition, also the braking torque can be regulated at a faster rate by phase-shifting the at least one inlet valve and the at least one exhaust valve simultaneously, while ensuring that maximum loads on the valves and their drive trains not are exceeded.

Optionally, the exhaust valve control arrangement comprises a decompression device arranged to open and close the at least one exhaust valve in a transition area between the exhaust stroke and the inlet stroke of the engine, when the piston is at a top dead center in the cylinder. Thereby, the braking torque is increased since the energy stored in compressed gases during the exhaust stroke will not be returned to the crank shaft on the subsequent inlet stroke, since the gases are evacuated to the exhaust system upon the opening and closing of the at least one exhaust valve. In addition, load on the at least one inlet valve and its drive train is reduced in the subsequent opening event of the at least one inlet valve, this since the pressure in the cylinder has been reduced by the opening and closing of the at least one exhaust valve.

Optionally, the decompression device is arranged to keep the at least one exhaust valve open until the at least one inlet valve is opened by the inlet valve control arrangement. Thereby, the formation of an under pressure in the cylinder is avoided during the inlet stroke.

Optionally, the decompression device is arranged to open and close the at least one exhaust valve in a transition area between the compression stroke and the expansion stroke of the engine, when the piston is at a top dead center in the cylinder. Thereby, the braking torque is increased since the energy stored in compressed gases during the compression stroke will not be returned to the crank shaft on the subsequent expansion stroke. This since the gases are evacuated to the exhaust system upon the opening and closing of the at least one exhaust valve.

Optionally, the exhaust valve control arrangement comprises a decompression device arranged to open and close the at least one exhaust valve in a transition area between the inlet stroke and the compression stroke of the engine, when the piston is at a bottom dead center in the cylinder. An important factor determining the brake torque is the amount of gas filled into the cylinder prior to compression of the gas. This since the compressed gases oppose the upward motion of the piston, and more gas filled into the cylinder will thus provide a greater opposing force onto the piston. In most cases, pressure of gas is higher at the exhaust than at the inlet. Accordingly, when the at least one exhaust valve is opened and closed in a transition area between the inlet stroke and the compression stroke of the engine, more gas will in these cases enter the cylinder due to the higher pressure at the exhaust than at the inlet. As a result, the braking torque can be even further increased.

Optionally, the exhaust valve phase-shifting device is configured to phase-shift control of the at least one exhaust valve in a range between 0 crankshaft degrees and an exhaust phase-shift control endpoint, wherein the exhaust phase-shift control endpoint is between −40 and −120 crankshaft degrees, preferably between −60 and −80 crankshaft degrees. Thereby, the amount of air pumped through the engine during engine braking and thus also the temperature of gases leaving the engine during the engine braking, as well as the size of the braking torque, is regulated to a great extent in an efficient manner.

Optionally, the inlet valve phase-shifting device is configured to phase-shift control of the at least one inlet valve in a range between 0 crankshaft degrees and an inlet phase-shift control endpoint, wherein the inlet phase-shift control endpoint is between 40 and 120 crankshaft degrees, preferably between 60 and 80 crankshaft degrees. Thereby, the amount of air pumped through the engine during the engine braking and thus also the temperature of gases leaving the engine during the engine braking, as well as the size of the braking torque, can be regulated to a great extent in an efficient manner.

Optionally, the inlet valve phase-shifting device is configured to keep a maximum cylinder pressure in the least one cylinder below a threshold cylinder pressure during the engine braking, by regulating the phase-shift of the at least one inlet valve. Thereby, reliability of the engine is ensured in an efficient manner. This since a too high cylinder pressure may cause damages of components such as valves and their drive trains.

Optionally, the engine comprises a charging device arranged to compress air to the inlet system, wherein the engine further comprises a control unit connected to the charging device, wherein the control unit is configured to further regulate the amount of air pumped through the engine during the engine braking, by regulating the charge air pressure of the charging device. Thereby, the amount of air pumped through the engine during the engine braking is regulated to an even greater extent.

According to a second aspect of the invention, the object is achieved by a vehicle comprising a four-stroke internal combustion engine according to some embodiments. Since the vehicle comprises a four-stroke internal combustion engine capable of performing an efficient engine braking while providing conditions for an improved control of gas temperature of gases leaving the engine during the engine braking, a vehicle is provided capable of performing an efficient engine braking while conditions are provided for an improved control of gas temperature of gases leaving the engine during the engine braking. As a result, the above-mentioned object is achieved.

According to a third aspect of the invention, the object is achieved by a method of controlling a four-stroke internal combustion engine comprising:
　at least one cylinder;
　a piston arranged in each cylinder;
　an inlet system;
　a crankshaft;
　at least one inlet valve arranged in each cylinder, which inlet valve is connected with the inlet system;
　an inlet valve control arrangement configured to control each inlet valve on the basis of a rotational position of the crankshaft;
　at least one exhaust valve arranged in each cylinder, which exhaust valve is connected with an exhaust outlet of the engine;
　an exhaust valve control arrangement configured to control each exhaust valve on the basis of the rotational position of the crankshaft,
　wherein the exhaust valve control arrangement comprises an exhaust valve phase-shifting device, wherein the inlet valve control arrangement comprises an inlet valve phase-shifting device, and wherein the method comprises:

phase-shifting control of the at least one exhaust valve, using the exhaust valve phase-shifting device, to a state where the at least one exhaust valve is controlled in such a way that it is opened during the expansion stroke of the engine and closed during the exhaust stroke of the engine, in order to achieve engine-braking via compression in the cylinders during the exhaust stroke, and regulating the amount of air pumped through the engine during the engine braking, by regulating the phase-shift of the at least one inlet valve, using the inlet valve phase-shifting device.

Since the method comprises the step of phase-shifting control of the at least one exhaust valve, using the exhaust valve phase-shifting device, to a state where the at least one exhaust valve is controlled in such a way that it is opened during the expansion stroke of the engine and closed during the exhaust stroke of the engine, engine-braking via compression in the cylinders during the exhaust stroke is obtained in a simple and effective manner. Further, since the method comprises the step of regulating the amount of air pumped through the engine during the engine braking, by regulating the phase-shift of the at least one inlet valve, using the inlet valve phase-shifting device, also the temperature of gases leaving the engine during the engine braking is regulated in a simple and efficient manner.

Accordingly, the method provides an efficient engine braking and conditions for an improved control of gas temperature of gases leaving the engine during the engine braking. As a result, the above-mentioned object is achieved.

In addition, since conditions are provided for an improved control of gas temperature of gases leaving the engine, conditions are also provided for keeping the temperature of an exhaust aftertreatment system within a suitable temperature interval during the engine braking. Thus, the method of controlling a four-stroke internal combustion engine also provides conditions for an engine being more environmentally-friendly.

Further, the regulating of the phase-shift of the at least one inlet valve further affects the charge mass, load on the valves and their drive trains, as well as the braking torque. Accordingly, the method provides conditions for a simple and effective control of the amount of air pumped through the engine, as well as a control of the braking torque, while ensuring that maximum loads on the valves and their drive trains not are exceeded.

Optionally, the method further comprises:
phase-shifting control of the at least one inlet valve to a state where the at least one inlet valve is controlled in such a way that it is opened during the inlet stroke of the engine and closed during the compression stroke of the engine, using the inlet valve phase-shifting device.

Thereby, the at least one inlet valve will be opened at a lower cylinder pressure which reduces the opening force of the at least one inlet valve and thus also reduces load on the inlet valve control arrangement. Further, by phase-shifting control of the at least one inlet valve in this manner, the maximum cylinder pressure during the compression stroke can be reduced. By reducing the opening fore of the at least one inlet valve and by reducing the maximum cylinder pressure, the risk of engine failure during engine braking is reduced.

Optionally, the method further comprises:
regulating the amount of air pumped through the engine during the engine braking, by regulating the phase-shift of the at least one exhaust valve, using the exhaust valve phase-shifting device.

Thereby, the amount of air pumped through the engine during the engine braking is regulated to a greater extent and at a faster rate, since phase-shift of the at least one exhaust valve as well as the at least one inlet valve are utilized to regulate the amount of air pumped through the engine. Thereby, it can be further ensured that temperature of gases leaving the engine, and thus also temperature of an exhaust aftertreatment system, is within a suitable temperature interval.

Optionally, the method further comprises:
regulating the size of the braking torque during engine braking to a set level braking torque by regulating the phase-shift of the at least one inlet valve and the at least one exhaust valve, using the inlet valve phase-shifting device and the exhaust valve phase-shifting device.

Thereby, the set level braking torque is obtained in a fast and efficient manner, while ensuring that temperature of gases leaving the engine, and thus also temperature of an exhaust aftertreatment system, is within a suitable temperature interval. The set level braking torque is obtained in a fast and efficient manner since the inlet valve phase-shifting device and the exhaust valve phase-shifting device are utilized to obtain the set level braking torque.

Optionally, the method further comprises:
phase-shifting the at least one inlet valve and the at least one exhaust valve simultaneously, using the inlet valve phase-shifting device and the exhaust valve phase-shifting device Thereby, the amount of air pumped through the engine during the engine braking is regulated at an even faster rate, since phase-shift of the at least one exhaust valve, as well as the at least one inlet valve, is utilized simultaneously to regulate the amount of air pumped through the engine. Thereby, it can be further ensured that temperature of gases leaving the engine, and thus also temperature of an exhaust aftertreatment system, is within a suitable temperature interval. In addition, also the braking torque can be regulated at a faster rate by phase-shifting the at least one inlet valve and the at least one exhaust valve simultaneously, while ensuring that maximum loads on the valves and their drive trains not are exceeded.

Optionally, the exhaust valve control arrangement comprises a decompression device, and wherein the method further comprises:
opening and closing the at least one exhaust valve in a transition area between the exhaust stroke and the inlet stroke of the engine, when the piston is at a top dead center in the cylinder, using the decompression device.

Thereby, the braking torque is increased since the energy stored in compressed gases during the exhaust stroke will not be returned to the crank shaft on the subsequent inlet stroke, since the gases are evacuated to the exhaust system upon the opening and closing of the at least one exhaust valve. In addition, load on the at least one inlet valve and its drive train is reduced in the subsequent opening event of the at least one inlet valve, this since the pressure in the cylinder has been reduced by the opening and closing of the at least one exhaust valve.

Optionally, the method further comprises:
keeping the at least one exhaust valve open, using the decompression device, until the at least one inlet valve is opened by the inlet valve control arrangement.

Thereby, the formation of an under pressure in the cylinder is avoided during the inlet stroke.

Optionally, the method further comprises:
opening and closing the at least one exhaust valve in a transition area between the compression stroke and the expansion stroke of the engine, when the piston is at a top dead center in the cylinder, using the decompression device.

Thereby, the braking torque is increased since the energy stored in compressed gases during the compression stroke will not be returned to the crank shaft on the subsequent expansion stroke. This since the gases are evacuated to the exhaust system upon the opening and closing of the at least one exhaust valve.

Optionally, the exhaust valve control arrangement comprises a decompression device, and wherein the method further comprises:

opening and closing the at least one exhaust valve in a transition area between the inlet stroke and the compression stroke of the engine, when the piston is at a bottom dead center in the cylinder, using the decompression device.

As a result, the braking torque is even further increased since more gas will enter the cylinder due to a higher pressure at the exhaust than at the inlet.

Optionally, the method further comprises:

phase-shifting control of the at least one exhaust valve in a range between 0 crankshaft degrees and an exhaust phase-shift control endpoint, using the exhaust valve phase-shifting device, wherein the exhaust phase-shift control endpoint is between −40 and −120 crankshaft degrees, preferably between −60 and −80 crankshaft degrees.

Thereby, the amount of air pumped through the engine during engine braking and thus also the temperature of gases leaving the engine during the engine braking, as well as the size of the braking torque, can be regulated to a great extent in an efficient manner.

Optionally, the method further comprises:

phase-shifting control of the at least one inlet valve in a range between 0 crankshaft degrees and an inlet phase-shift control endpoint, using the inlet valve phase-shifting device, wherein the inlet phase-shift control endpoint is between 40 and 120 crankshaft degrees, preferably between 60 and 80 crankshaft degrees.

Thereby, the amount of air pumped through the engine during engine braking and thus also the temperature of gases leaving the engine during the engine braking, as well as the size of the braking torque, can be regulated to a great extent in an efficient manner.

Optionally, the method further comprises:

keeping a maximum cylinder pressure in the least one cylinder below a threshold cylinder pressure during the engine braking, by regulating the phase-shift of the at least one inlet valve, using the inlet valve phase-shifting device.

Thereby, reliability of the engine is ensured in an efficient manner. This since a too high cylinder pressure may cause damages of components such as valves and their drive trains.

Optionally, the engine comprises a charging device arranged to compress air to the inlet system, wherein the engine further comprises a control unit connected to the charging device, wherein the method further comprises:

further regulating the amount of air pumped through the engine during the engine braking, by regulating the charge air pressure of the charging device, using the control unit.

Thereby, the amount of air pumped through the engine during the engine braking is regulated to an even greater extent.

According to a fourth aspect of the invention, the object is achieved by a computer program for performing a method of controlling a four-stroke internal combustion engine, wherein the computer program comprises computer readable code configured to cause a central processing unit of a control unit of the engine to perform the method according to some embodiments of above.

Since the computer readable code of the computer program is configured to cause a central processing unit of a control unit of the engine to perform a method providing an efficient engine braking while providing conditions for an improved control of gas temperature of gases leaving the engine during the engine braking, the computer program provided is capable of providing an efficient engine braking and conditions for an improved control of gas temperature of gases leaving the engine during the engine braking.

As a result, the above-mentioned object is achieved.

According to a fifth aspect of the invention, the object is achieved by a computer program product for performing a method of controlling a four-stroke internal combustion engine, wherein the computer program product comprises computer readable code configured to cause a central processing unit of a control unit of the engine to perform the method according the method according to some embodiments of above.

Since the computer readable code of the computer program product is configured to cause a central processing unit of a control unit of the engine to perform a method providing an efficient engine braking while providing conditions for an improved control of gas temperature of gases leaving the engine during the engine braking, the computer program product provided is capable of providing an efficient engine braking and conditions for an improved control of gas temperature of gases leaving the engine during the engine braking.

As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION OF THE INVENTION

Aspects of the present invention will now be described more fully. Like numbers refer to like elements throughout. Well-known functions or constructions will not necessarily be described in detail for brevity and/or clarity.

Figure 1:
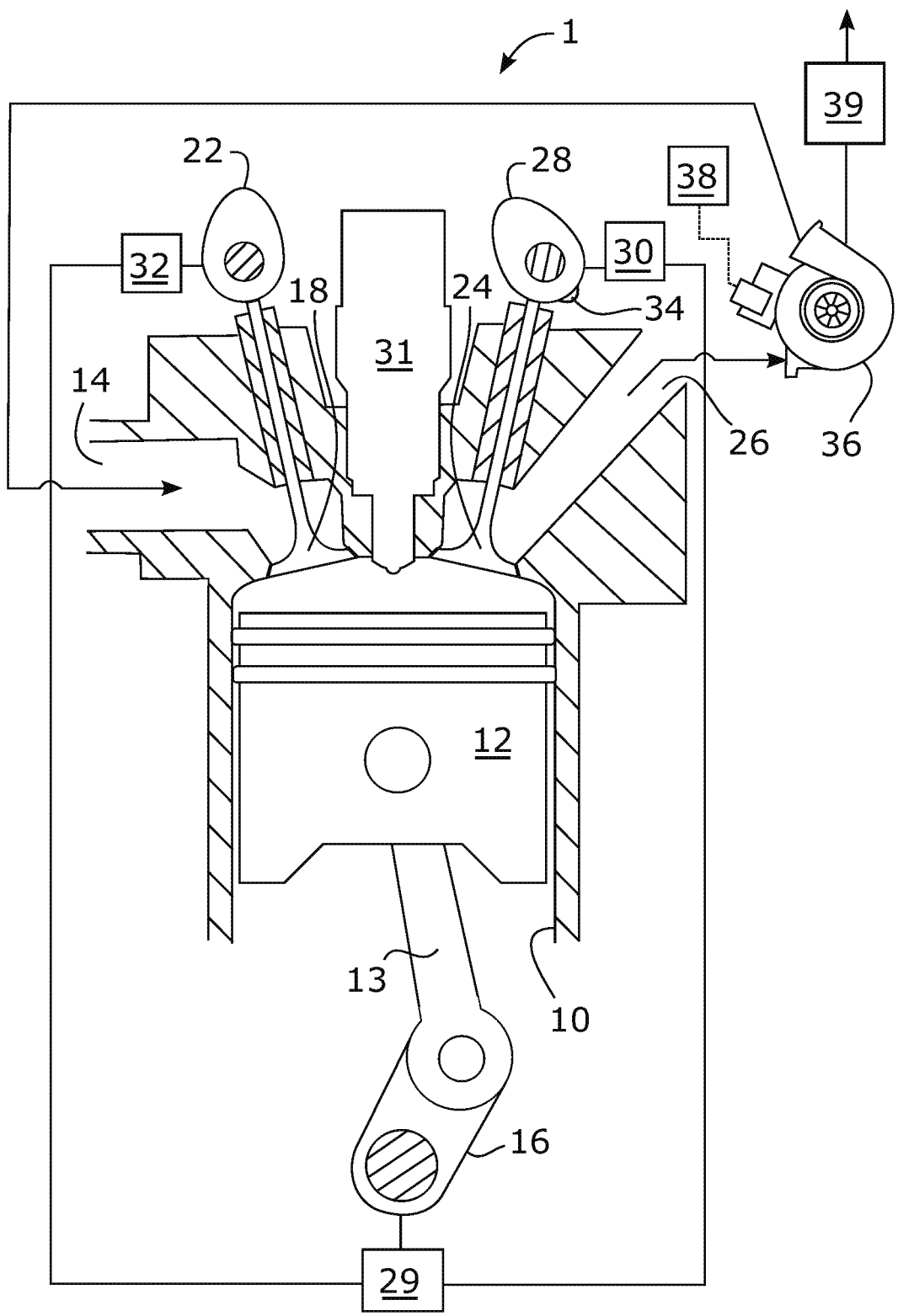
FIG. 1 illustrates a cross sectional view of a four-stroke internal combustion engine.

FIG. 1 illustrates a cross sectional view of a four-stroke internal combustion engine 1, according to some embodiments. The engine 1 comprises at least one cylinder 10 and a piston 12 arranged in each cylinder 10. The piston 12 is connected, via a connecting rod 13 to a crankshaft 16, which at rotation moves the piston 12 forwards and backwards in the cylinder 10, between a top dead center TDC and a bottom dead center BDC. The engine 1 comprises an inlet system 14, which in the illustrated example engine is illustrated as an inlet duct. The inlet system 14 may further comprise an air filter, and according to some embodiments a throttle, a fuel injector, an air flow sensor, etc. In the illustrated embodiments, the inlet system 14 is fluidically connected to a compressor of a charging device 36, as will be further explained below. The engine 1 further comprises at least one inlet valve 18 arranged in each cylinder 10, which at least one inlet valve 18 is connected with the inlet system 14. The engine 1 further comprises an inlet valve control arrangement 22 configured to control each inlet valve 18 on the basis of a rotational position of the crankshaft 16. The engine 1 further comprises at least one exhaust valve 24 arranged in each cylinder 10, which at least one exhaust valve 24 is connected with an exhaust outlet 26 of the engine 1. The engine 1 further comprises an exhaust valve control arrangement 28 configured to control each exhaust valve 24 on the basis of the rotational position of the crankshaft 16. In FIG. 1, the at least one inlet valve 18 and the at least one exhaust valve 24 are illustrated in a respective closed position. In the closed position, each valve 18, 24 abuts against a respective valve seat to close fluid connection between the cylinder 10 and the respective inlet system 14 and the exhaust outlet 26.

The inlet valve control arrangement 22 is arranged to control the at least one inlet valve 18 between the closed position and an open position by displacing the at least one inlet valve 18 in a direction into the cylinder 10. A fluid connection is thereby opened between the inlet system 14 and the cylinder 10. Likewise, the exhaust valve control arrangement 28 is arranged to control the at least one exhaust valve 24 between the closed position and an open position by displacing the at least one exhaust valve 24 in a direction into the cylinder 10. Thereby, a fluid connection is opened between the cylinder 10 and the exhaust outlet 26. Upon displacement of a valve 18, 24 from the closed position to the open position, the valve 18, 24 is lifted from its valve seat. The engine 1 further comprises a fuel injector 31 arranged to directly inject fuel into the cylinder 10. The engine 1 in the illustrated embodiments is a diesel engine. According to further embodiments, the engine may be an Otto engine with a spark-ignition device, wherein the Otto engine may be designed to run on gas, petrol, alcohol or similar volatile fuels or combinations thereof. Such fuel may be directly injected into the cylinder 10 using a fuel injector, or may be added to incoming air prior to entering the cylinder 10, for example by a fuel injector arranged at an inlet duct of the engine.

The exhaust valve control arrangement 28 and the inlet valve control arrangement 22 may each comprise one or more camshafts rotatably connected to the crankshaft 16, wherein the camshafts comprises cam lobes arranged to displace valves 18, 24 to an open position by pressing on valve stems of the valves 18, 24 upon rotation of the camshaft. The exhaust valve control arrangement 28 and/or the inlet valve control arrangement 22 may according to further embodiments comprise electric, pneumatic or hydraulic actuators arranged to control valves on the basis of the rotational position of the crankshaft 16. The rotational position of the crankshaft 16 may be obtained using a crank angle sensor 29.

The exhaust valve control arrangement 28 comprises an exhaust valve phase-shifting device 30 configured to phase-shift control of the at least one exhaust valve 24 in relation to the crankshaft 16. Further, the inlet valve control arrangement 22 comprises an inlet valve phase-shifting device 32 configured to phase-shift control of the at least one inlet valve 18 in relation to the crankshaft 16. The exhaust valve phase-shifting device 30 and the inlet valve phase-shifting device 32 may each comprise a hydraulic arrangement, for example using engine oil as hydraulic fluid, to phase-shift control of the valves 18, 24 in relation to the crankshaft 16. Such hydraulic arrangement may form part of a belt pulley (not illustrated) arranged to transfer rotation from the crankshaft 16 to a camshaft of the exhaust valve control arrangement 28 and/or the inlet valve control arrangement 22, wherein the hydraulic arrangement is arranged to regulate an angular relationship between a first portion of the belt pulley, being connected to the crankshaft 16, and a second portion of the belt pulley, being connected to the camshaft, in order to phase-shift control of the at least one inlet valve 18 and/or the at least one exhaust valve 24. In embodiments wherein the exhaust valve control arrangement 28 and/or the inlet valve control arrangement 22 comprises electric, pneumatic or hydraulic actuators, the phase-shift of control of the at least one inlet valve 18 and/or the at least one exhaust valve 24 may be performed in other manners, for example by an electronic phase-shift of control.

The exhaust valve phase-shifting device 30 is configured to phase-shift control of the at least one exhaust valve 24 in relation to the crankshaft 16 to a state where the at least one exhaust valve 24 is controlled in such a way that it is opened during the expansion stroke of the engine 1 and closed during the exhaust stroke of the engine 1. Thereby, engine-braking via compression in the cylinders 10 during the exhaust stroke is achieved in a simple and efficient manner. The inlet valve phase-shifting device 32 is configured to regulate the amount of air pumped through the engine 1, during the engine braking, by regulating the phase-shift of the at least one inlet valve 18. Thereby, the amount of air pumped through the engine 1 is regulated in an efficient and simple manner. As a result thereof, the temperature of gases leaving the engine 1 during the engine braking can also be controlled in an efficient and simple manner, as well as a temperature of an exhaust aftertreatment system 39 of the engine 1. The exhaust aftertreatment system 39 may comprise one or more of a catalytic converter, a particulate filter, a Selective catalytic reduction (SCR) arrangement, a Diesel Oxidation Catalyst (DOC), a Lean NOx Trap (LNT) and a Three-Way Catalyst (TWC).

According to the illustrated embodiments, the engine 1 comprises a charging device 36 arranged to compress air to the inlet system 14. The charging device 36 illustrated is a turbo-charger comprising a turbine arranged to be driven by gases from the exhaust outlet 26. The turbine is arranged at a shaft connected to a compressor wheel which is arranged to compress air to the inlet system 14. The engine 1 may comprise another type of charging device, such as a compressor arranged to be driven by the crankshaft 16 of the engine 1. The engine 1 further comprises a control unit 38 connected to the charging device 36. The control unit 38 is configured to further regulate the amount of air pumped through the engine 1 during the engine braking, by regulating the charge air pressure of the charging device 36. Thereby, the amount of air pumped through the engine 1, during the engine braking, is regulated to an even greater extent. In the illustrated embodiments, the control unit 38 is configured to regulate the charge air pressure of the charging device 36 by regulating a waste gate valve of the charging device 36. According to further embodiments, the charging device 36 is a Variable-geometry turbocharger (VGT). In such embodiments, the control unit 38 may be configured to regulate the charge air pressure of the charging device 36 by regulating geometry of an inlet portion of the turbine of the turbocharger, for example by regulating angular positions of vanes arranged at the inlet portion of the turbine.

The control unit 38 may be further connected to other components of the engine to control operation thereof, such as the inlet valve control arrangement 22, the inlet valve phase-shifting device 32, the exhaust valve control arrangement 28, the exhaust valve phase-shifting device 30, and a decompression device 34, as is further explained below. For brevity and clarity, such connections are not illustrated in FIG. 1. Further, the control unit 38 may be connected to a number of different sensors to obtain signals therefrom. Examples are sensors arranged to sense absolute pressure in the inlet manifold, exhaust pressure, charge air temperature, mass airflow, throttle position, engine speed, engine load, rotational position of the crank shaft 16, etc.

The exhaust valve control arrangement 28 comprises a decompression device 34 arranged to selectively perform auxiliary opening events of the at least one exhaust valve 24, by opening and closing the at least one exhaust valve 24. The decompression device 34 may comprise one or more decompression cam lobes arranged at a camshaft of the exhaust valve control arrangement 28, which decompression cam lobes are arranged to, when the decompression device 34 is activated, perform auxiliary opening events of the at least one exhaust valve 24 by displacing the at least one exhaust valve 24 towards the open position. In such embodiments, and in other embodiments described herein, the at least one exhaust valve 24, as well as the at least one inlet valve 18, may be biased, for example by a spring, towards the closed position.

FIG. 2a-FIG. 2f illustrate opening events 51-54 in different operational modes of the exhaust valve control arrangement 28, the inlet valve control arrangement 22 and the decompression device 34 illustrated in FIG. 1. Therefore, below, reference is made to the FIG. 2a-FIG. 2f, as well as to FIG. 1. The curves illustrated in FIG. 2a-FIG. 2f illustrate opening events performed during two revolutions of the crank shaft 16, i.e. during all four strokes of the four-stroke internal combustion engine 1. In these figures, the strokes are illustrated in the following order: compression stroke 41, expansion stroke 42, exhaust stroke 43 and inlet stroke 44.

Figure 2A:
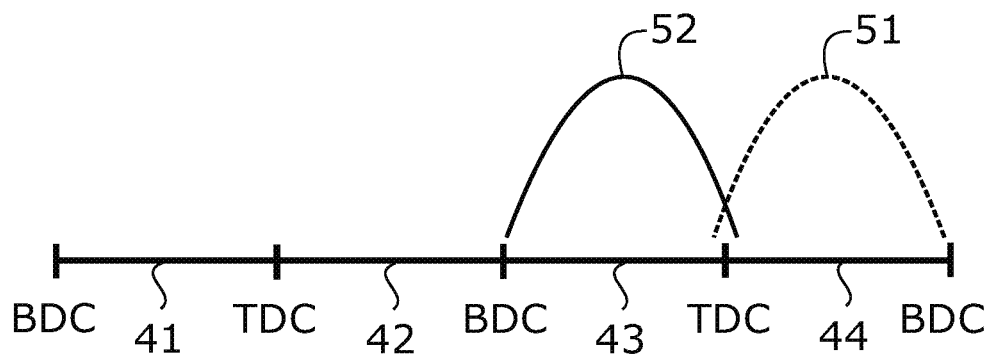
FIG. 2a illustrates opening events of an at least one inlet valve and an at least one exhaust valve, during a normal power producing operational mode of the engine.

FIG. 2a illustrates opening events 51 of the at least one inlet valve 18, and opening events 52 of the at least one exhaust valve 24, during a normal power producing operational mode of the engine 1. As indicated, during the compression stroke 41 and the expansion stroke 42, the at least one inlet valve 18 and the at least one exhaust valve 24 are closed. When the piston reaches the bottom dead center BDC at the end of the expansion stroke 42, the exhaust valve control arrangement 28 controls the at least one exhaust valve 24 to an open position to allow exhaust gases to be expelled from the cylinder 10 to the exhaust outlet 26 during the exhaust stroke 43. In the transition area between the exhaust stroke 43 and the inlet stroke 44, the exhaust valve control arrangement 28 controls the at least one exhaust valve 24 to a closed position. Further, in the transition area between the exhaust stroke 43 and the inlet stroke 44, the inlet valve control arrangement 22 controls the at least one inlet valve 18 to an open position to allow air, or an air/fuel mixture, to enter the cylinder 10 during the inlet stroke 44. Towards the end of the inlet stroke 44, the inlet valve control arrangement 22 controls the at least one inlet valve 18 to a closed position to allow compression of the air, or the air/fuel mixture, in the subsequent compression stroke 41.

Figure 2B:
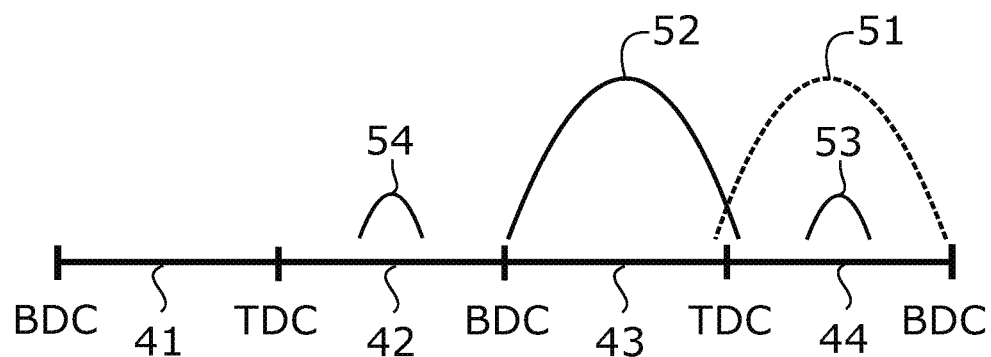
FIG. 2b illustrates opening events of the at least one inlet valve and the at least one exhaust valve, during a first engine braking operational mode.

FIG. 2b illustrates opening events 51 of the at least one inlet valve 18 and opening events 52-54 of the at least one exhaust valve 24, during a first engine braking operational mode of the engine 1. In this mode, the decompression device 34 performs an opening event 53, i.e. opens and closes the at least one exhaust valve 24, during the inlet stroke 44 and an opening event 54 during the expansion stroke 42. A low amount of braking torque is obtained in the first engine braking operational mode. The opening event 54 of the at least one exhaust valve 24 during the expansion stroke 42 results in a slightly increased braking torque as compared to an operational mode, as is illustrated in FIG. 1, where no additional openings of the at least one exhaust valve 24 are performed by the decompression device 34. The slightly increased braking is caused by the fact that some gas is expelled out from the cylinder 10 to the exhaust outlet 26 as a result of the opening event 54 of the at least one exhaust valve 24 during the expansion stroke 42. The compressed gas will thereby not return its energy to the crank shaft in the remaining portion of the expansion stroke 42. The opening event 53 of the at least one exhaust valve 24 during the inlet stroke 44 has no significant effect on the braking torque. Even though a low amount of braking torque is obtained in the first engine braking operational mode of the engine 1, as illustrated in FIG. 2b, considerable cylinder pressures may arise in the transition area between the compression stroke 41 and the expansion stroke 42, when the piston 12 is in the top dead center. This since the at least one inlet valve 18 is open during essentially the entire inlet stroke 44 and is closed in a transition area between the inlet stroke 44 and the compression stroke 41, when the piston is at the bottom dead center, allowing a lot of air into the cylinder during the inlet stroke 44. This air is then fully compressed in the subsequent compression stroke 41, since no valves are opened during the full movement of the piston from the bottom dead center to the top dead center during the compression stroke 41. As a result thereof, considerable cylinder pressures may occur in the first engine braking operational mode.

Figure 2C:
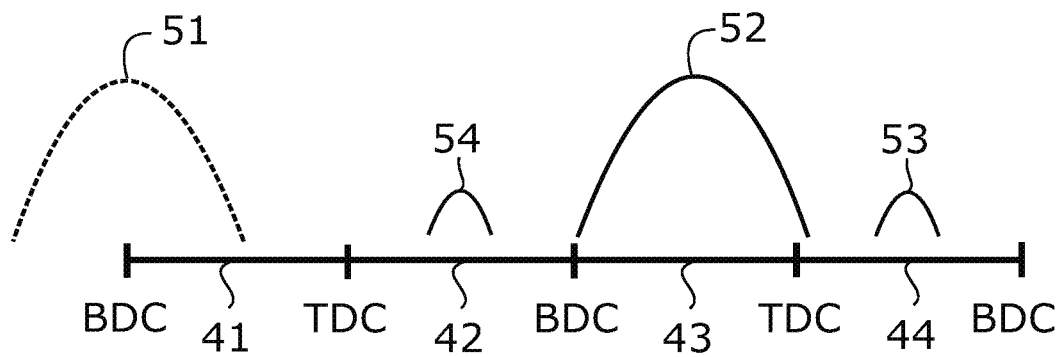
FIG. 2c illustrates opening events of the at least one inlet valve and the at least one exhaust valve, during a second engine braking operational mode.

FIG. 2c illustrates opening events 51 of the at least one inlet valve 18 and opening events 52-54 of the at least one exhaust valve 24, during a second engine braking operational mode of the engine 1. In the second engine braking operational mode of the engine 1, the inlet valve phase-shifting device 32 phase-shifts control of the at least one inlet valve 18 to a state where the at least one inlet valve 18 is controlled in such a way that it is opened during the inlet stroke 44 of the engine 1 and closed during the compression stroke 41 of the engine 1. Thereby, the maximum cylinder pressure is reduced, since the at least one inlet valve 18 is open during a portion of the compression stroke 41 allowing some of the air being filled into the cylinder during the inlet stroke 44 to be expelled out again into the inlet system 14 upon the movement of the piston from the bottom dead center towards the top dead center in the compression stroke 41. In FIG. 2c, as well as in FIGS. 2d-2f, the curve 51 illustrating the opening event 51 of the at least one inlet valve 18 extends into the portion of the inlet stroke 44, but this is not illustrated in these figures for the reason of brevity and clarity. Correspondingly, the portion to the left of the compression stroke 41 in FIG. 2c, and FIGS. 2d-2f can be seen as a portion of the inlet stroke 44.

Figure 2D:
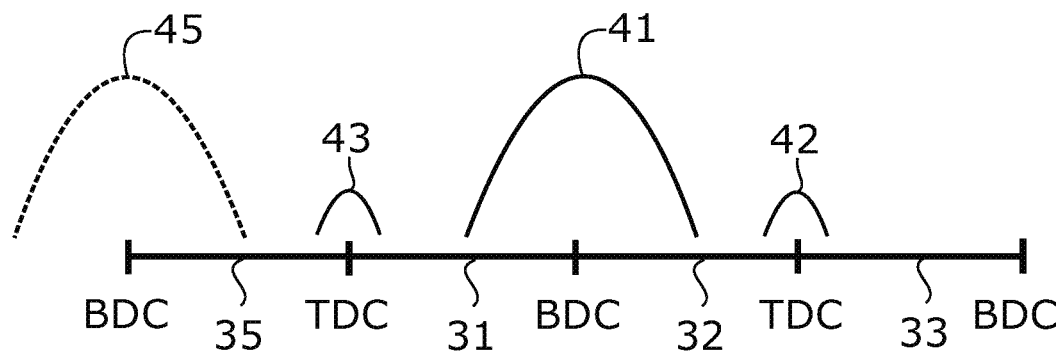
FIG. 2d illustrates opening events of the at least one inlet valve and the at least one exhaust valve, during a third engine braking operational mode.

FIG. 2d illustrates opening events 51 of the at least one inlet valve 18 and opening events 52-54 of the at least one exhaust valve 24 (illustrated in FIGS. 2a-2c), during a third engine braking operational mode of the engine 1. In the third engine braking operational mode of the engine 1, the exhaust valve phase-shifting device 30 performs a phase-shift of control of the at least one exhaust valve 24 to a state where the at least one exhaust valve 24 is controlled in such a way that it is opened during the expansion stroke 42 and closed during the exhaust stroke 43 of the engine 1. Thereby, engine braking via compression in the cylinders 10 is achieved in a simple and effective manner during the exhaust stroke 43.

Further, as seen in FIG. 2d, the additional opening events 53, 54 by the decompression device 34 of the at least one exhaust valve 24 (illustrated in FIGS. 2b and 2c) have also been phase-shifted as a result of the phase-shift of control of the at least one exhaust valve 24. In the third engine braking operational mode illustrated in FIG. 2d, the decompression device 34 performs an opening event 54, i.e. opens and closes the at least one exhaust valve 24, in the transition area between the compression stroke 41 and the expansion stroke 42, and an opening event 53 in the transition area between the exhaust stroke 43 and the inlet stroke 44. This significantly increases the braking torque as compared to the second engine braking operational mode of the engine 1 illustrated in FIG. 2c, since gas is evacuated from the cylinder 10 after the compression in the compression stroke 41, as well as after compression in the exhaust stroke 41. Thus, according to these embodiments, the exhaust valve phase-shifting device 30 is arranged to also phase-shift control of the decompression device 34 by an amount corresponding to the phase-shift of control of the at least one exhaust valve 24. This may be achieved by phase-shifting of a camshaft arranged to control the at least one exhaust valve 24, in relation to the crank shaft 16, wherein the camshaft comprises one or more decompression cam lobes. Thus, in such embodiments, a phase-shift of control of the at least one exhaust valve 24 will also result in a corresponding phase-shift of control of the decompression device 34. According to some embodiments, the decompression device 34 is arranged to keep the at least one exhaust valve 24 open during the opening event 53 (illustrated in FIGS. 2b and 2c) until the at least one inlet valve 18 is opened by the inlet valve control arrangement 22, to avoid that an under pressure is formed in the cylinder 10 during the inlet stroke 44.

The exhaust valve phase-shifting device 30 may be configured to phase-shift control of the at least one exhaust valve 24 in a range between 0 crankshaft degrees and an exhaust phase-shift control endpoint. The exhaust phase-shift control endpoint may be between −40 and −120 crankshaft degrees, or between −50 and −100 crankshaft degrees, or preferably between −60 and −80 crankshaft degrees. The exhaust valve phase-shifting device 30 may thus phase-shift control of the at least one exhaust valve 24, and according to some embodiments also the decompression device 34, back and forth in such a range. Thereby, the amount of air pumped through the engine 1 during engine braking, as well as the size of the braking torque, can be regulated to a great extent in an efficient manner.

Figure 2E:
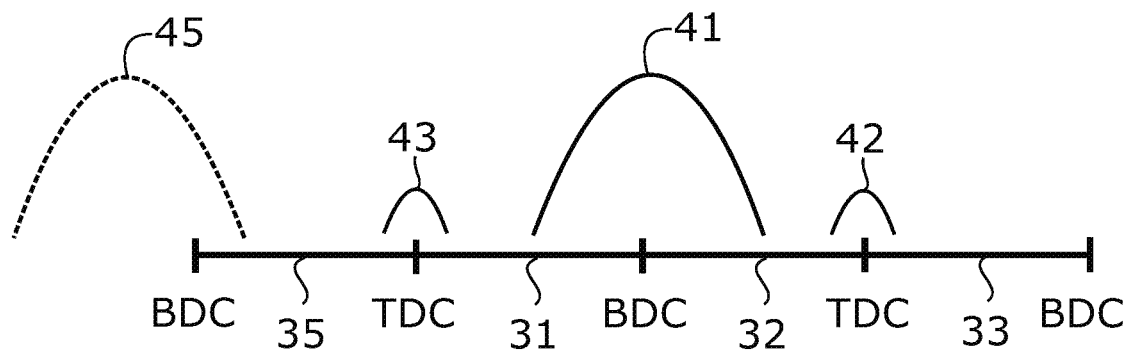
FIG. 2e illustrates opening events of the at least one inlet valve and the at least one exhaust valve, during a fourth engine braking operational mode.

FIG. 2e illustrates opening events 51 of the at least one inlet valve 18 and opening events 52-54 of the at least one exhaust valve 24, during a fourth engine braking operational mode of the engine 1. In the fourth engine braking operational mode of the engine 1, the inlet valve phase-shifting device 32 has reduced phase-shift of control of the at least one inlet valve 18. This results in an increased braking torque as compared to the third engine braking operational mode illustrated in FIG. 2d, since the at least one inlet valve 18 closes earlier in the compression stroke 41, as compared to the third engine braking operational mode. By closing the at least one inlet valve 18 earlier in the compression stroke 41, a greater proportion of the gas will be kept in the cylinder 10 in the compression stroke 41 and will thereby provide a greater opposing force on the piston during the compression stroke 41.

The inlet valve phase-shifting device 32 may be configured to phase-shift control of the at least one inlet valve 18 in a range between and 0 crankshaft degrees and an inlet phase-shift control endpoint. The inlet phase-shift control endpoint may be between 40 and 120 crankshaft degrees, or between 50 and 100 crankshaft degrees, or preferably between 60 and 80 crankshaft degrees. The inlet valve phase-shifting device 32 may thus phase-shift control of the at least one inlet valve 18 back and forth in such a range to regulate the amount of air pumped through the engine 1 during engine braking. The phase-shift of control of the at least one inlet valve 18 further affects the charge mass, load on the valves 18, 24 and their drive trains, as well as the braking torque which thus also may be controlled by phase-shifting control of the at least one inlet valve 18. Thus, conditions are provided for an efficient control of the amount of air pumped through the engine 1, as well as an efficient control of the size of the braking torque and the charge mass, without exceeding maximal load limits on the valves 18, 24 and their drive trains.

In addition, as mentioned above, the exhaust valve phase-shifting device 30 may be configured to regulate the amount of air pumped through the engine 1 during the engine braking, by regulating the phase-shift of the at least one exhaust valve 24. Thereby, the amount of air pumped through the engine 1 during the engine braking is regulated to a greater extent and at a faster rate, since phase-shift of the at least one exhaust valve 24 as well as the at least one inlet valve 18 in these embodiments are utilized to regulate the amount of air pumped through the engine 1. Thereby, it can be further ensured that temperature of gases leaving the engine 1, and thus also temperature of an exhaust aftertreatment system 39, is within a suitable temperature interval. The phase-shift of control of the at least one exhaust valve 24 further affects the charge mass, load on the valves 18, 24 and their drive trains as well as the braking torque which thus also may be controlled by phase-shifting control of the at least one exhaust valve 24. According to some embodiments, the inlet valve phase-shifting device 32 and the exhaust valve phase-shifting device 30 may be arranged to perform simultaneous phase-shift of control of the at least one inlet valve 18 and the at least one exhaust valve 24. Thereby, an engine 1 is provided in which the amount of air pumped through the engine 1, the charge mass and the braking torque is controlled at a faster rate without exceeding maximum load on the valves 18, 24 and their drive trains.

The inlet valve phase-shifting device 32 may be configured to keep a maximum cylinder pressure in the at least one cylinder 10 below a threshold cylinder pressure during the engine braking, by regulating the phase-shift of the at least one inlet valve 18. Thereby, reliability of the engine can be ensured in an efficient manner. In further embodiments, the inlet valve phase-shifting device 32 and the exhaust valve phase-shifting device 30 are arranged to regulate the size of the braking torque during engine braking to a set level braking torque by regulating the phase-shift of the at least one inlet valve 18 and the at least one exhaust valve 24. Thereby, the set level braking torque can be obtained in a fast and efficient manner, while ensuring that maximum loads on the valves 18, 24 and their drive trains not are exceeded and ensuring that temperature of gases leaving the engine 1, and thus also temperature of an exhaust aftertreatment system 39, is within a suitable temperature interval.

Figure 2F:
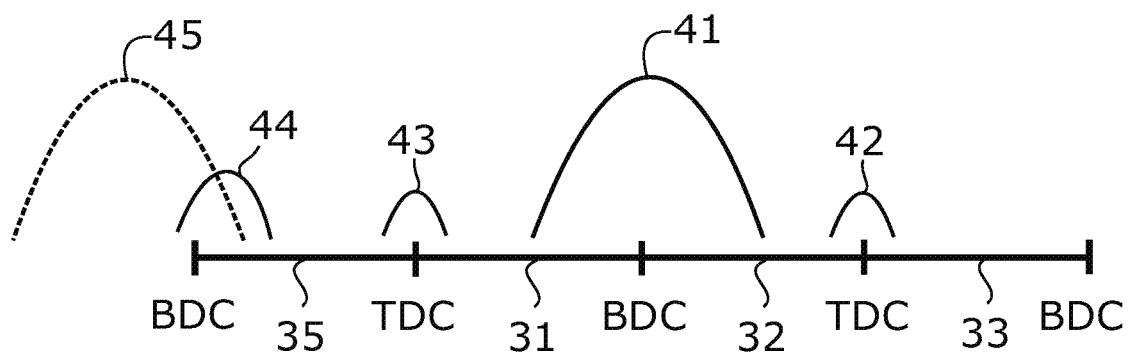
FIG. 2f illustrates opening events of the at least one inlet valve and the at least one exhaust valve, during a fifth engine braking operational mode.

FIG. 2f illustrates opening events 51 of the at least one inlet valve 18 and opening events 52-55 of the at least one exhaust valve 24, during a fifth engine braking operational mode of the engine 1. In the fifth engine braking operational mode, the decompression device 34 performs an opening event 55, i.e. opens and closes the at least one exhaust valve 24, in a transition area between the inlet stroke 44 and the compression stroke 41 of the engine 1, when the piston 12 is at a bottom dead center in the cylinder 10. In most cases, the gas pressure is higher at the exhaust outlet 26 than at the inlet system 14. Thus, according to the fifth engine braking operational mode, the braking torque may be further increased, since the gas from the exhaust outlet 26, having a higher pressure than gas at the inlet system 14, may enter the cylinder 10 when the at least one exhaust valve 24 is open, which thereby results in a greater amount of gas to be compressed in the compression stroke 41. As seen in FIG. 2f, the at least one inlet valve 18 may close prior to the at least one exhaust valve 24 in the compression stroke 41. In this manner, flow of gas from the exhaust outlet 26 to the inlet system 14 is avoided and the above-mentioned effect of increasing the braking torque is ensured.

During an engine braking event, the amount of air pumped through the engine, the charge mass, as well as the size of the braking torque, may be regulated by using the above described engine braking operational modes. This may be performed by a stepwise or gradual switch between the different engine braking operational modes.

As an example, in an initial portion of an engine braking event, i.e. when a driver releases the accelerator pedal, the valves 18, 24 are controlled in the manner depicted in FIG. 2a, i.e. without any phase-shifts performed or any activation of the decompression device 34. After this, for example following a brake request, the engine 1 may enter the first engine braking operational mode in which the decompression device 34 is activated but provides little or no additional braking torque. Then, the second engine braking operational mode may be utilized in which control of the at least one inlet valve 18 is phase-shifted, e.g. to lower the cylinder pressure during the compression stroke 41. Then, the engine 1 may enter the third engine braking operational mode in which control of the at least one exhaust valve 24 is phase-shifted to increase the braking torque. Instead of performing these steps in a step wise manner, the phase-shift of control of the at least one inlet valve 18 and the at least one exhaust valve 24 may be performed simultaneously, as described above. After this, the fourth engine braking operational mode may be utilized in which the inlet valve phase-shifting device 32 reduces the phase-shift of the control of the at least one inlet valve 18 to further increase the braking torque. Then, the fifth engine braking operational mode may be utilized in which the decompression device 34 performs the opening event 55 to even further increase the braking torque.

The different engine braking operational modes may thus be utilized in a step wise manner to progressively increase the braking torque. Alternatively, or in addition, the selection of, and/or the transition between, the different engine braking operational modes may be performed in dependence of a wanted braking torque level, a wanted airflow through the engine 1, a wanted charge air mass, and/or a wanted temperature of the exhaust aftertreatment system 39. Further, as understood from the above, a gradual transition between different engine braking operational modes may be performed, for example by a gradual phase-shift of control of the at least one inlet valve 18 and/or the at least one exhaust valve 24.

Figure 3:
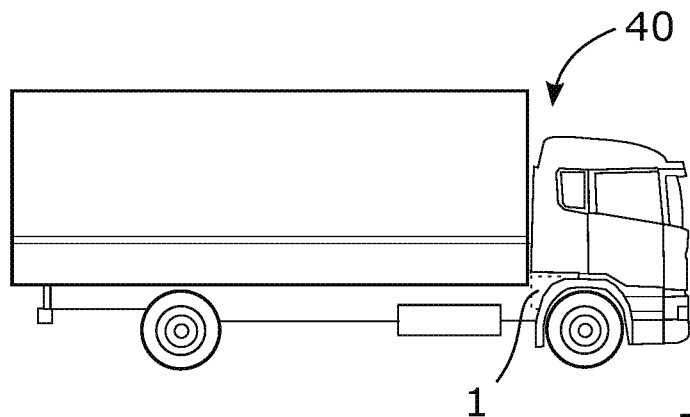
FIG. 3 illustrates vehicle comprising a four-stroke internal combustion engine.

FIG. 3 illustrates vehicle 40 comprising a four-stroke internal combustion engine 1, according to some embodiments, for propulsion of the vehicle 40. The vehicle 40 illustrated in FIG. 3 is a truck. However, the four-stroke internal combustion engine 1 may be comprised in another type of manned or unmanned vehicle for land based propulsion such as a lorry, a bus, a construction vehicle, a tractor, a car, etc.

Figure 4:
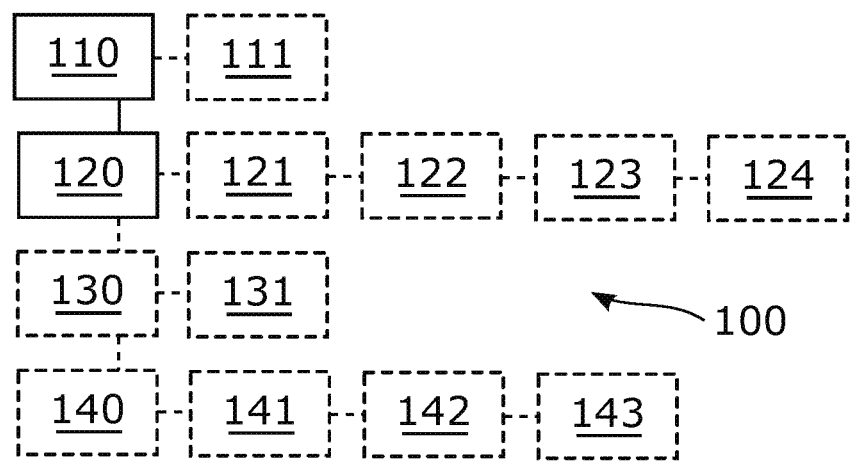
FIG. 4 illustrates a method of controlling a four-stroke internal combustion engine.

FIG. 4 illustrates a method 100 of controlling a four-stroke internal combustion engine 1. The engine 1 may be an four-stroke internal combustion engine 1 according to the embodiments illustrated in FIG. 1. Therefore, below, reference is made to FIG. 4 as well as to FIG. 1. The method 100 is a method 100 of controlling a four-stroke internal combustion engine 1 comprising:

at least one cylinder 10;
a piston 12 arranged in each cylinder 10;
an inlet system 14;
a crankshaft 16;
at least one inlet valve 18 arranged in each cylinder 10, which inlet valve 18 is connected with the inlet system 14;
an inlet valve control arrangement 22 configured to control each inlet valve 18 on the basis of a rotational position of the crankshaft 16;
at least one exhaust valve 24 arranged in each cylinder 10, which exhaust valve 24 is connected with an exhaust outlet 26 of the engine 1;
an exhaust valve control arrangement 28 configured to control each exhaust valve 24 on the basis of the rotational position of the crankshaft 16,
wherein the exhaust valve control arrangement 28 comprises an exhaust valve phase-shifting device 30, wherein the inlet valve control arrangement 22 comprises an inlet valve phase-shifting device 32, and wherein the method 100 comprises:
phase-shifting 110 control of the at least one exhaust valve 24, using the exhaust valve phase-shifting device 30, to a state where the at least one exhaust valve 24 is controlled in such a way that it is opened during the expansion stroke of the engine 1 and closed during the exhaust stroke of the engine 1, in order to achieve engine-braking via compression in the cylinders 10 during the exhaust stroke, and
regulating 120 the amount of air pumped through the engine 1 during the engine braking, by regulating the phase-shift of the at least one inlet valve 18, using the inlet valve phase-shifting device 32.

As illustrated in FIG. 4, the method 100 may further comprise:

phase-shifting 130 control of the at least one inlet valve 18 to a state where the at least one inlet valve 18 is controlled in such a way that it is opened during the inlet stroke of the engine 1 and closed during the compression stroke of the engine 1, using the inlet valve phase-shifting device 32.

As illustrated in FIG. 4, the method 100 may further comprise:

regulating 121 the amount of air pumped through the engine 1 during the engine braking, by regulating the phase-shift of the at least one exhaust valve 24, using the exhaust valve phase-shifting device 30.

As illustrated in FIG. 4, the method 100 may further comprise:

regulating 122 the size of the braking torque during engine braking to a set level braking torque by regulating the phase-shift of the at least one inlet valve 18 and the at least one exhaust valve 24, using the inlet valve phase-shifting device 32 and the exhaust valve phase-shifting device 30.

According to some embodiments, the exhaust valve control arrangement 28 comprises a decompression device 34, and wherein the method 100 may further comprise:

opening and closing 140 the at least one exhaust valve 24 in a transition area between the exhaust stroke and the inlet stroke of the engine 1, when the piston 12 is at a top dead center in the cylinder 10, using the decompression device 34.

As illustrated in FIG. 4, the method 100 may further comprise:

keeping 141 the at least one exhaust valve 24 open, using the decompression device 34, until the at least one inlet valve 18 is opened by the inlet valve control arrangement 22.

As illustrated in FIG. 4, the method 100 may further comprise:

opening and closing 142 the at least one exhaust valve 24 in a transition area between the compression stroke and the expansion stroke of the engine 1, when the piston 12 is at a top dead center in the cylinder 10, using the decompression device 34.

According to some embodiments, the exhaust valve control arrangement 28 comprises a decompression device 34, and wherein the method 100 may further comprise:

opening and closing 143 the at least one exhaust valve 24 in a transition area between the inlet stroke and the compression stroke of the engine 1, when the piston 12 is at a bottom dead center in the cylinder 10, using the decompression device 34.

As illustrated in FIG. 4, the method 100 may further comprise:

phase-shifting 111 control of the at least one exhaust valve 24 in a range between 0 crankshaft degrees and an exhaust phase-shift control endpoint, using the exhaust valve phase-shifting device 30, wherein the exhaust phase-shift control endpoint is between −40 and −120 crankshaft degrees, preferably between −60 and −80 crankshaft degrees.

As illustrated in FIG. 4, the method 100 may further comprise:

phase-shifting 131 control of the at least one inlet valve 18 in a range between 0 crankshaft degrees and an inlet phase-shift control endpoint, using the inlet valve phase-shifting device 32, wherein the inlet phase-shift control endpoint is between 40 and 120 crankshaft degrees, preferably between 60 and 80 crankshaft degrees.

As illustrated in FIG. 4, the method 100 may further comprise:

keeping 123 a maximum cylinder pressure in the least one cylinder 10 below a threshold cylinder pressure during the engine braking, by regulating the phase-shift of the at least one inlet valve 18, using the inlet valve phase-shifting device 32.

According to some embodiments, the engine 1 comprises a charging device 36 arranged to compress air to the inlet system 14, wherein the engine 1 further comprises a control unit 38 connected to the charging device 36, wherein the method 100 may further comprise:

further regulating 124 the amount of air pumped through the engine during the engine braking, by regulating the charge air pressure of the charging device 36, using the control unit 38.

Figure 5:
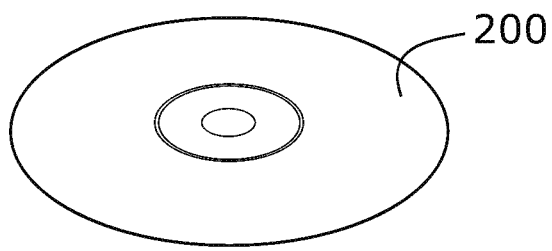
FIG. 5 illustrates a computer program product for performing a method of controlling a four-stroke internal combustion engine.

FIG. 5 illustrates a computer program product 200 for performing a method 100 of controlling a four-stroke internal combustion engine 1, as illustrated in FIG. 1, wherein the computer program product 200 comprises computer readable code configured to cause a central processing unit of a control unit 38 of the engine 1 to perform the method 100 as illustrated in FIG. 4.

Further, the computer program product 200 comprises a computer program for performing a method 100 of controlling a four-stroke internal combustion engine 1, as illustrated in FIG. 1, wherein the computer program comprises computer readable code configured to cause a central processing unit of a control unit 38 of the engine 1 to perform the method 100 as illustrated in FIG. 4.

The control unit 38 may be connected to the inlet valve control arrangement 22, the inlet valve phase-shifting device 32, the exhaust valve control arrangement 28, the exhaust valve phase-shifting device 30, and the decompression device 34 to control operation of these components in order to perform the method 100 illustrated in FIG. 4.

One skilled in the art will appreciate that the method of controlling a four-stroke internal combustion engine 1 may be implemented by programmed instructions. These programmed instructions are typically constituted by a computer program, which, when it is executed in control unit 38, ensures that the control unit 38 carries out the desired control, such as the method steps 110, 111, 120-124, 130, 131, 140-143 described herein. The computer program is usually part of a computer program product 200 which comprises a suitable digital non-transitory storage medium on which the computer program is stored.

The control unit 38 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control unit 38 may further comprise a memory unit, wherein the calculation unit may be connected to the memory unit, which may provide the calculation unit with, for example, stored program code and/or stored data which the calculation unit may need to enable it to do calculations.

The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control unit 38 is connected to components of the four-stroke internal combustion engine 1 for receiving and/or sending input and output signals. These input and output signals may comprise waveforms, pulses or other attributes which the input signal receiving devices can detect as information and which can be converted to signals processable by the control unit 38. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the four-stroke internal combustion engine 1 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the four-stroke internal combustion engine 1 comprises a control unit 38 but might alternatively be implemented wholly or partly in two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles of the type here concerned are therefore often provided with significantly more control units than depicted in FIG. 1, as one skilled in the art will surely appreciate.

The computer program product 200 may be provided for instance in the form of a data carrier carrying computer program code for performing at least some of the method steps 110, 111, 120-124, 130, 131, 140-143 according to some embodiments when being loaded into one or more calculation units of the control unit 38. The data carrier may be, e.g. a CD ROM disc, as is illustrated in FIG. 5, or a ROM (read-only memory), a PROM (programable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control unit 38 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. For instance, the term braking torque as used herein may also be called braking effect, retarding power, or similar. The term "air" as used herein may comprise a mixture of air, fuel and/or recirculated exhaust gases. Further, the terms compression stroke 41, expansion stroke 42, exhaust stroke 43 and inlet stroke 44 may be replaced by the terms compression phase 41, expansion phase 42, exhaust phase 43 and inlet phase 44.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A four-stroke internal combustion engine comprising:
at least one cylinder;
a piston arranged in each cylinder;
an inlet system;
a crankshaft;
at least one inlet valve arranged in each cylinder, which inlet valve is connected with the inlet system;
an inlet valve control arrangement configured to control each inlet valve on the basis of a rotational position of the crankshaft;
at least one exhaust valve arranged in each cylinder, which exhaust valve is connected with an exhaust outlet of the engine;
an exhaust valve control arrangement configured to control each exhaust valve on the basis of the rotational position of the crankshaft; and
an exhaust treatment system,
wherein the exhaust valve control arrangement comprises an exhaust valve phase-shifting device configured to phase-shift control of the at least one exhaust valve to a state where the at least one exhaust valve is controlled in such a way that it is opened during the expansion stroke of the engine and closed during the exhaust stroke of the engine, in order to achieve engine-braking via compression in the cylinders during the exhaust stroke, and
wherein the inlet valve control arrangement comprises an inlet valve phase-shifting device configured to variably control a phase-shift of the at least one inlet valve to thereby control the amount of air pumped through the engine and thus regulate the temperature of the exhaust aftertreatment system during the engine braking.

2. The engine according to claim 1, wherein the inlet valve phase-shifting device is configured to phase-shift control of the at least one inlet valve to a state where the at least one inlet valve is controlled in such a way that it is opened during the inlet stroke of the engine and closed during the compression stroke of the engine.

3. The engine according to claim 1, wherein the exhaust valve phase-shifting device is configured to regulate the amount of air pumped through the engine during the engine braking, by variably controlling the phase-shift of the at least one exhaust valve.

4. The engine according to claim 1, wherein the inlet valve phase-shifting device and the exhaust valve phase-shifting device are arranged to regulate the size of the braking torque during engine braking to a set level braking torque by variably controlling the phase-shift of the at least one inlet valve and the at least one exhaust valve.

5. The engine according to claim 1, wherein the exhaust valve control arrangement comprises a decompression device arranged to open and close the at least one exhaust valve in a transition area between the exhaust stroke and the inlet stroke of the engine, when the piston is at a top dead center in the cylinder.

6. The engine according to claim 5, wherein the decompression device is arranged to keep the at least one exhaust valve open until the at least one inlet valve is opened by the inlet valve control arrangement.

7. The engine according to claim 5, wherein the decompression device is arranged to open and close the at least one exhaust valve in a transition area between the compression stroke and the expansion stroke of the engine, when the piston is at a top dead centre in the cylinder.

8. The engine according to claim 1, wherein the exhaust valve control arrangement comprises a decompression device arranged to open and close the at least one exhaust valve in a transition area between the inlet stroke and the compression stroke of the engine, when the piston is at a bottom dead center in the cylinder.

9. The engine according to claim 1, wherein the exhaust valve phase-shifting device is configured to phase-shift control of the at least one exhaust valve in a range between 0 crankshaft degrees and an exhaust phase-shift control endpoint, wherein the exhaust phase-shift control endpoint is between −40 and −120 crankshaft degrees.

10. The engine according to claim 1, wherein the exhaust valve phase-shifting device is configured to phase-shift control of the at least one exhaust valve in a range between 0 crankshaft degrees and an exhaust phase-shift control endpoint, wherein the exhaust phase-shift control endpoint is between −60 and −80 crankshaft degrees.

11. The engine according to claim 1, wherein the inlet valve phase-shifting device is configured to phase-shift control of the at least one inlet valve in a range between 0 crankshaft degrees and an inlet phase-shift control endpoint, wherein the inlet phase-shift control endpoint is between 40 and 120 crankshaft degrees.

12. The engine according to claim 1, wherein the inlet valve phase-shifting device is configured to phase-shift control of the at least one inlet valve in a range between 0 crankshaft degrees and an inlet phase-shift control endpoint, wherein the inlet phase-shift control endpoint is between 60 and 80 crankshaft degrees.

13. The engine according to claim 1, wherein the engine comprises a charging device arranged to compress air to the inlet system, wherein the engine further comprises a control unit connected to the charging device, wherein the control unit is configured to further regulate the amount of air pumped through the engine during the engine braking, by variably controlling the charge air pressure of the charging device.

14. The engine according to claim 1, wherein the inlet valve phase-shifting device is configured to regulate the amount of air pumped through the engine to control the temperature of the exhaust aftertreatment system during the engine braking by variably controlling the phase-shift of the at least one inlet valve in a range between 0 crankshaft degrees and an inlet phase-shift control endpoint, wherein the inlet phase-shift control endpoint is between 40 and 120 crankshaft degrees.

15. The engine according to claim 1, wherein the inlet valve phase-shifting device is configured to regulate the amount of air pumped through the engine to control the temperature of the exhaust aftertreatment system during the engine braking by variably controlling the phase-shift of the at least one inlet valve in a range between 0 crankshaft degrees and an inlet phase-shift control endpoint, wherein the inlet phase-shift control endpoint is between 60 and 80 crankshaft degrees.

16. A vehicle comprising a four-stroke internal combustion engine, wherein the engine comprises:
 at least one cylinder;
 a piston arranged in each cylinder;
 an inlet system;
 a crankshaft;
 at least one inlet valve arranged in each cylinder, which inlet valve is connected with the inlet system;
 an inlet valve control arrangement configured to control each inlet valve on the basis of a rotational position of the crankshaft;
 at least one exhaust valve arranged in each cylinder, which exhaust valve is connected with an exhaust outlet of the engine;
 an exhaust valve control arrangement configured to control each exhaust valve on the basis of the rotational position of the crankshaft; and
 an exhaust treatment system,
 wherein the exhaust valve control arrangement comprises an exhaust valve phase-shifting device configured to phase-shift control of the at least one exhaust valve to a state where the at least one exhaust valve is controlled in such a way that it is opened during the expansion stroke of the engine and closed during the exhaust stroke of the engine, in order to achieve engine-braking via compression in the cylinders during the exhaust stroke, and
 wherein the inlet valve control arrangement comprises an inlet valve phase-shifting device configured to variably control a phase-shift of the at least one inlet valve to thereby control the amount of air pumped through the engine and thus regulate the temperature of the exhaust aftertreatment system during the engine braking.

17. A method of controlling a four-stroke internal combustion engine, wherein the engine comprises at least one cylinder; a piston arranged in each cylinder; an inlet system; a crankshaft; at least one inlet valve arranged in each cylinder, which inlet valve is connected with the inlet system; an inlet valve control arrangement configured to control each inlet valve on the basis of a rotational position of the crankshaft; at least one exhaust valve arranged in each cylinder, which exhaust valve is connected with an exhaust outlet of the engine; an exhaust valve control arrangement configured to control each exhaust valve on the basis of the rotational position of the crankshaft; and an exhaust treatment system, wherein the exhaust valve control arrangement comprises an exhaust valve phase-shifting device, wherein the inlet valve control arrangement comprises an inlet valve phase-shifting device, and wherein the method comprises:
 phase-shifting control of the at least one exhaust valve, using the exhaust valve phase-shifting device, to a state where the at least one exhaust valve is controlled in such a way that it is opened during the expansion stroke of the engine and closed during the exhaust stroke of the engine, in order to achieve engine-braking via compression in the cylinders during the exhaust stroke; and
 variably controlling a phase-shift of the at least one inlet valve using the inlet valve phase-shifting device to thereby control the amount of air pumped through the engine to regulate the temperature of the exhaust aftertreatment system during the engine braking.

18. The method according to claim 17 further comprising:
phase-shifting control of the at least one inlet valve to a state where the at least one inlet valve is controlled in such a way that it is opened during the inlet stroke of the engine and closed during the compression stroke of the engine, using the inlet valve phase-shifting device.

19. The method according to claim 17 further comprising:
regulating the size of the braking torque during engine braking to a set level braking torque by variably controlling the phase-shift of the at least one inlet valve and the at least one exhaust valve, using the inlet valve phase-shifting device and the exhaust valve phase-shifting device.

20. The method according to claim 17, wherein the exhaust valve control arrangement comprises a decompression device, and wherein the method further comprises:
opening and closing the at least one exhaust valve in a transition area between the exhaust stroke and the inlet stroke of the engine, when the piston is at a top dead center in the cylinder, using the decompression device.

21. The method according to claim 17, wherein the engine comprises a charging device arranged to compress air to the inlet system, wherein the engine further comprises a control unit connected to the charging device, wherein the method further comprises:
further regulating the amount of air pumped through the engine during the engine braking, by variably controlling the charge air pressure of the charging device, using the control unit.

22. A computer program product comprising computer program code stored on a non-transitory computer-readable medium, said computer program product for performing a method of controlling a four-stroke internal combustion engine, wherein the engine comprises at least one cylinder; a piston arranged in each cylinder; an inlet system; a crankshaft; at least one inlet valve arranged in each cylinder, which inlet valve is connected with the inlet system; an inlet valve control arrangement configured to control each inlet valve on the basis of a rotational position of the crankshaft; at least one exhaust valve arranged in each cylinder, which exhaust valve is connected with an exhaust outlet of the engine; an exhaust valve control arrangement configured to control each exhaust valve on the basis of the rotational position of the crankshaft; and an exhaust treatment system, wherein the exhaust valve control arrangement comprises an exhaust valve phase-shifting device, wherein the inlet valve control arrangement comprises an inlet valve phase-shifting device, said computer program product comprising computer instructions to cause one or more computer processors to perform the following operations:
phase-shifting control of the at least one exhaust valve, using the exhaust valve phase-shifting device, to a state where the at least one exhaust valve is controlled in such a way that it is opened during the expansion stroke of the engine and closed during the exhaust stroke of the engine, in order to achieve engine-braking via compression in the cylinders during the exhaust stroke; and
variably controlling a phase-shift of the at least one inlet valve using the inlet valve phase-shifting device to control the amount of air pumped through the engine and thus regulate the temperature of the exhaust aftertreatment system during the engine braking.

* * * * *